US009151236B2

(12) United States Patent
Gruener

(10) Patent No.: US 9,151,236 B2
(45) Date of Patent: Oct. 6, 2015

(54) CONTROL DEVICE OF A MOTOR VEHICLE

(71) Applicant: Dr. Ing. h.c. F. Porsche Aktiengesellschaft, Stuttgart (DE)

(72) Inventor: Florian Gruener, Benningen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 299 days.

(21) Appl. No.: 13/782,413

(22) Filed: Mar. 1, 2013

(65) Prior Publication Data

US 2013/0261940 A1 Oct. 3, 2013

(30) Foreign Application Priority Data

Mar. 28, 2012 (DE) .......................... 10 2012 102 654

(51) Int. Cl.
*B60W 10/08* (2006.01)
*F02D 35/00* (2006.01)
*F02N 11/08* (2006.01)
*B60W 10/06* (2006.01)
*B60W 30/188* (2012.01)
(Continued)

(52) U.S. Cl.
CPC ............... *F02D 35/00* (2013.01); *B60W 10/06* (2013.01); *B60W 10/08* (2013.01); *B60W 20/1082* (2013.01); *B60W 20/40* (2013.01); *B60W 30/1882* (2013.01); *F02N 11/0829* (2013.01); *B60W 2510/0619* (2013.01); *F02D 41/1495* (2013.01); *Y02T 10/48* (2013.01); *Y02T 10/6286* (2013.01); *Y10S 903/902* (2013.01)

(58) Field of Classification Search
CPC ........ F02D 29/02; B60W 20/00; B60W 10/08
USPC ....................................... 701/22, 54, 102, 112
See application file for complete search history.

(56) References Cited

U.S. PATENT DOCUMENTS

| 2002/0083930 | A1 | 7/2002 | Robichaux et al. |
| 2009/0293465 | A1 | 12/2009 | Niimi et al. |
| 2011/0029176 | A1 | 2/2011 | Rauner et al. |

FOREIGN PATENT DOCUMENTS

| DE | 102009035845 A1 | 2/2001 |
| DE | 10200016 A1 | 10/2002 |

(Continued)

OTHER PUBLICATIONS

Translation of Japanese Office Action mailed Jul. 1, 2014 in counterpart Japanese Application No. 2013-056233.

(Continued)

*Primary Examiner* — Mahmoud Gimie
(74) *Attorney, Agent, or Firm* — RatnerPrestia

(57) ABSTRACT

A control device of a motor vehicle, for controlling and/or regulating at least the operation of an internal combustion engine, wherein, before the execution of at least one defined function and/or during the execution of at least one defined function, the control device demands operation of the internal combustion engine in a defined operating state, and wherein, as a function of the length of time for which the respective defined function has not been executed and/or as a function of the length of time for which a defined operating state of the internal combustion engine has not occurred, the control device determines a defined characteristic variable, on the basis of which the control device, in a temporally variable manner, determines different and/or variable measures for influencing the operating state of the internal combustion engine.

12 Claims, 1 Drawing Sheet

(51) Int. Cl.
*B60W 20/00* (2006.01)
*F02D 41/14* (2006.01)

(56) References Cited

FOREIGN PATENT DOCUMENTS

| JP | 2000104615 | | 4/2000 |
|----|------------|---|--------|
| JP | 2000110650 | | 4/2000 |
| JP | 2008019780 | A | 1/2008 |
| JP | 2010265867 | A | 11/2010 |
| JP | 2011001859 | A | 1/2011 |

OTHER PUBLICATIONS

Japanese Patent Office Rejection, dated Oct. 29, 2013, corresponding to counterpart Japanese Patent Application No. 2013-056233.

CONTROL DEVICE OF A MOTOR VEHICLE

CROSS-REFERENCE TO RELATED APPLICATIONS

This application claims priority to German Patent Application No. 10 2012 102 654,8, filed Mar. 28, 2012, which is incorporated by reference herein in its entirety.

FIELD OF THE INVENTION

The invention relates to a control device of a motor vehicle. The invention also relates to a method for operating a motor vehicle.

BACKGROUND OF THE INVENTION

DE 10 2009 035 845 A1, which is incorporated by reference, discloses a method for operating a fuel vapor retention system of a motor vehicle, specifically of a hybrid vehicle or of a motor vehicle with an automatic start-stop system, in which method, during vehicle operation, factors which have an influence on the fuel vaporization are monitored and used such that an undesired overflow or breakthrough of an activated carbon filter is prevented. If an overflow or breakthrough of the activated carbon filter is impending, a stopping or deactivation of an internal combustion engine or of a combustion engine of the motor vehicle is prohibited. Here, the method of the fuel vapor retention system is hard-coded such that, if the overflow or breakthrough of the activated carbon filter is identified by a controller on the basis of a defined criterion, one and the same measure is always implemented, specifically the prohibition of the stopping or deactivation of the internal combustion engine or combustion engine.

DE 102 00 016 A1, which is incorporated by reference, discloses a method for purging a vapor vessel of a hybrid vehicle, in which method a time which has elapsed since the most recent purging of the vapor vessel is determined, wherein said time since the most recent purging of the vapor vessel is compared with a time stage, that is to say a defined criterion, and wherein the internal combustion engine is started as a function of said comparison. In said method, too, hard coding is provided, specifically such that, if a fixed time stage is exceeded, one and the same measure is always implemented, specifically the starting of the internal combustion engine.

SUMMARY OF THE INVENTION

Described herein is a control device of a motor vehicle and a method for operating a motor vehicle.

According to one aspect of the invention, a control device of a motor vehicle controls and/or regulates at least the operation of an internal combustion engine of the motor vehicle, wherein, before the execution of at least one defined function and/or during the execution of at least one defined function, the control device demands operation of the internal combustion engine in a defined operating state, wherein, as a function of the length of time for which the respective defined function has not been executed and/or as a function of the length of time for which a defined operating state of the internal combustion engine has not occurred, the control device determines a defined characteristic variable, on the basis of which the control device, in a temporally variable manner, determines different and/or variable measures for influencing the operating state of the internal combustion engine.

According to aspects of the invention, as a function of the length of time for which the respective defined function has not been executed and/or as a function of the length of time for which a defined operating state of the internal combustion engine has not occurred, the control device determines a defined characteristic variable, on the basis of which the control device, in a temporally variable manner, determines different and/or variable measures for influencing the operating state of the internal combustion engine.

The invention proposes a control device of a motor vehicle which, as a function of the length of time for which a controller function of the control device has not been executed and/or as a function of the length of time for which a defined operating state of the internal combustion engine has not occurred, and in a temporally variable manner, determines different measures for influencing the operating state of the internal combustion engine.

Accordingly, in the control device according to aspects of the invention, there is no hard temporal coding of a measure, which is always the same and thus hard-coded, for influencing the operating state of the internal combustion engine; in fact, the control device determines an urgency of the respective function and/or of the respective operating state of the internal combustion engine, and as a function of the urgency, determines variable measures for influencing the operating state of the internal combustion engine. This permits flexible and advantageous operation of a motor vehicle.

It may be preferable that the control device determines either a stop prohibition or no stop prohibition for the internal combustion engine as a function of the defined characteristic variable, and/or the control device determines a combustion-air/fuel ratio for the operation of the internal combustion engine as a function of the defined characteristic variable.

The above measures which the control device can implement, in order to influence the operating state of the internal combustion engine, in a temporally variable manner are suitable both for use in conventional motor vehicles which comprise only an internal combustion engine and also for use in hybrid vehicles which comprise at least one electric machine in addition to an internal combustion engine.

According to one advantageous refinement of the invention, if the motor vehicle is in the form of a hybrid vehicle and comprises at least one electric machine in addition to the internal combustion engine, the control device demands a passive load-point shift between the internal combustion engine and electric machine or an active load-point shift between the internal combustion engine and electric machine as a function of the defined characteristic variable.

The utilization of the passive load-point shift and/or active load-point shift is suitable for hybrid vehicles in which, while maintaining a constant drive torque acting at the drive output of the motor vehicle, the internal combustion engine of the hybrid drive and the or each electric machine thereof can be operated at different load points.

It is preferably provided that, when the internal combustion engine is running and when the defined function is not being executed and/or when the defined operating state of the internal combustion engine is not present, the control device determines the characteristic variable which is dependent on at least one operating parameter of the internal combustion engine, wherein said control device determines, in a temporally variable manner, that is to say at variable time intervals, as a function of the defined characteristic variable, variable measures for influencing the operating state of the internal combustion engine.

The control device preferably determines an exhaust gas mass integral or combustion air mass integral of the internal combustion engine as a characteristic variable. The use of the exhaust gas mass integral of the internal combustion engine or of the combustion air mass integral of the internal combustion engine as a characteristic variable is advantageous in particular if, as a function, a diagnostic function of an exhaust system must be evaluated with regard to its urgency in order, as a function of the urgency, to determine in a temporally variable manner at least one variable measure for influencing the operating state of the internal combustion engine.

According to one advantageous refinement of the invention, if the motor vehicle is in the form of a hybrid vehicle and if the characteristic variable is below a lower threshold value, the control device demands a passive load-point shift, wherein the control device demands an active load-point shift if the characteristic variable is above the lower threshold value, specifically such that, if the characteristic variable is above an upper threshold value, said control device demands an active load-point shift with permanent stop prohibition for the internal combustion engine, whereas if the characteristic variable is below the upper threshold value and above the lower threshold value, said control device demands an active load-point shift and a stop prohibition for the internal combustion engine in the event of a positive driver demand.

Said determination of different measures for influencing the operating state of the internal combustion engine in three different stages permits, in hybrid vehicles, particularly preferable, urgency-dependent and variable influencing of the operating state of the internal combustion engine.

According to one aspect of the invention, a method for operating a motor vehicle, specifically for the control and/or regulation of at least one internal combustion engine of the motor vehicle using a control device, wherein a defined characteristic variable, on the basis of which different and/or variable measures for influencing the operating state of the internal combustion engine are determined in a temporally variable manner, is determined as a function of the length of time for which the respective defined function has not been executed and/or as a function of the length of time for which a defined operating state of the internal combustion engine has not occurred.

BRIEF DESCRIPTION OF THE DRAWINGS

Preferred embodiments of the invention will emerge from the subclaims and from the following description. Exemplary embodiments of the invention will be explained in more detail on the basis of the drawing, without the invention being restricted to these. In the drawing:

DETAILED DESCRIPTION OF THE DRAWINGS

Figure 1:
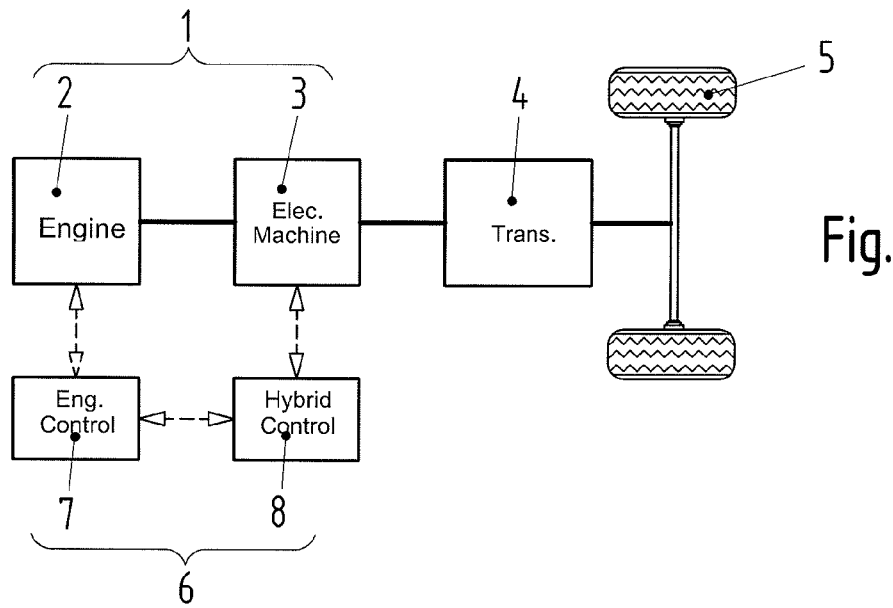
FIG. 1 shows a schematic illustration of a hybrid vehicle having a hybrid drive and having a control system for the hybrid drive.

FIG. 1 shows a highly schematic diagram of a motor vehicle designed as a hybrid vehicle, wherein the hybrid vehicle comprises a hybrid drive with an internal combustion engine and an electric machine. The hybrid vehicle also comprises a transmission which is connected between the internal combustion engine and a drive output.

FIG. 1 also shows a control device for the hybrid drive, wherein the control device comprises an engine controller and a hybrid controller.

The engine controller of the control device controls and/or regulates the operation of the internal combustion engine. The hybrid controller of the control device controls and/or regulates the operation of the electric machine.

In FIG. 1, the engine controller 7 and the hybrid controller 8 are implemented in one and the same control device 6.

By contrast to this, it is also possible for the engine controller 7 and the hybrid controller 8 to be implemented in different control devices.

In the case of a hybrid drive, it is possible, while maintaining a constant drive torque acting at the drive output 5, for the internal combustion engine 2 to be operated at different load points, and for the excess or deficit of the respective engine load of the internal combustion engine 2 to be compensated by means of the electric machine 3. If, for example, excess drive torque in relation to a driver demand is provided by the internal combustion engine 2, the excess can be utilized, in a generator mode of the electric machine 3, to charge an electric energy store. If too little drive torque in relation to a driver demand is provided by the internal combustion engine 2, the difference can be provided by the electric machine 3, in a motor mode of the latter, with more intense discharging of an electric energy store.

In the engine controller 7 there are implemented a multiplicity of functions, for example diagnostic functions, which can be executed only when the internal combustion engine 2 of the hybrid drive 1 is running. These include for example a diagnostic function for an engine temperature sensor and a diagnostic function for a lambda probe of an exhaust-gas catalytic converter.

As a function of the length of time for which a defined controller function of the control device has not been executed and/or the length of time for which a defined operating state of the internal combustion engine 2 has not occurred, the control device 6, according to aspects of the invention, specifically the engine controller 7, determines a defined characteristic variable, on the basis of which the control device, in a temporally variable manner, determines different and/or variable measures for influencing the operating state of the internal combustion engine 2.

It is for example possible for either a stop prohibition or no stop prohibition for the internal combustion engine 2 to be demanded as a first variable measure as a function of the defined characteristic variable and thus as a function of the length of time for which the respective defined controller function has not been executed and/or as a function of the length of time for which a defined operating state of the internal combustion engine has not occurred.

When a stop prohibition is demanded, this may be demanded permanently or only while there is a positive driver demand torque.

As a second variable measure, the control device 6, specifically the engine controller 7, may predefine a combustion-air/fuel ratio for the operation of the internal combustion engine 2 as a function of the defined characteristic variable and thus as a function of the length of time for which the respective defined function has not been executed and/or as a function of the length of time for which a defined operating state of the internal combustion engine has not occurred.

It may for example be provided that, if the internal combustion engine 2 is in the form of an applied-ignition engine, by means of the combustion-air/fuel ratio, either a so-called quantitative load operating range with a combustion-air/fuel ratio of approximately one, or a stratified load operating range with a combustion-air/fuel ratio of considerably greater than one, is predefined for the operation of the internal combustion engine 2.

As a third measure that the control device 6, specifically the engine controller 7, can demand as a function of the length of time for which the respective defined function has not been executed and/or the length of time for which a defined operating state of the internal combustion engine 2 has not occurred, a passive load-point shift or an active load-point shift may be demanded or utilized.

A passive load-point shift is to be understood to mean that, when a controller function is executed at a defined load point of the internal combustion engine, said load point is held for the further execution of the respective controller function.

An active load-point shift is to be understood to mean that the control device actively adjusts toward that load point of the internal combustion engine at which the respective controller function can be executed, in order that the controller function can be performed.

The abovementioned different measures that are implemented or demanded by the control device as a function of the length of time for which the respective controller function of said control device has not been executed and/or the length of time for which a defined operating state of the internal combustion engine has not occurred may also be implemented or demanded in combination with one another by the control device, specifically the engine controller 7. For example, it is advantageous in particular in the case of hybrid vehicles for load-point shifts to be demanded together with stop prohibitions for the internal combustion engine.

When the internal combustion engine 2 is running and when the respective defined function is not being executed and/or when the defined operating state of the internal combustion engine 2 is not present, the control device determines the defined characteristic variable which is dependent on at least one further operating parameter of the internal combustion engine 2, wherein the or each measure for influencing the operating state of the internal combustion engine 2 is determined in a variable manner by the control device as a function of said characteristic variable.

According to a first variant, the control device 6, specifically the engine controller 7, may determine an exhaust gas mass integral or a combustion air mass integral for the internal combustion engine 2 as a characteristic variable in this regard, specifically when the internal combustion engine 2 is running and the respective controller function is not being executed or the respective operating state of the internal combustion engine has not occurred.

The control device may determine, as an alternative characteristic variable, a ratio between a driving distance covered with the internal combustion engine 2 running and a driving distance covered with the internal combustion engine 2 shut down, or a ratio between a driving duration with the internal combustion engine 2 running and a driving duration with the internal combustion engine 2 shut down.

As a further alternative characteristic variable, the control device may determine the number of driving cycles, with the internal combustion engine activated once, in which the respective controller function has not been executed and/or in which the respective operating state of the internal combustion engine has not occurred.

As already stated, the control device determines, in a temporally variable manner as a function of the determined characteristic variable, measures for influencing the operating state of the internal combustion engine, wherein, as has likewise already been stated, the determined characteristic variable reflects an urgency of the respective controller function or of the respective defined operating state of the internal combustion engine 2.

In one advantageous refinement, it is provided that if, in the case of a hybrid vehicle, the respective characteristic variable determined by the control device 6 is below a lower threshold value, said control device demands a passive load-point shift, whereas if the characteristic variable is above the lower threshold value, the control device demands an active load-point shift.

If the characteristic variable is above the lower threshold value and simultaneously above an upper threshold value, an active load-point shift with a permanent stop prohibition for the internal combustion engine 2 is demanded. By contrast, if the characteristic variable is merely above the lower threshold value but below the upper threshold value, then the control device demands an active load-point shift with a stop prohibition which is active only if a driver demand is positive.

Figure 2:
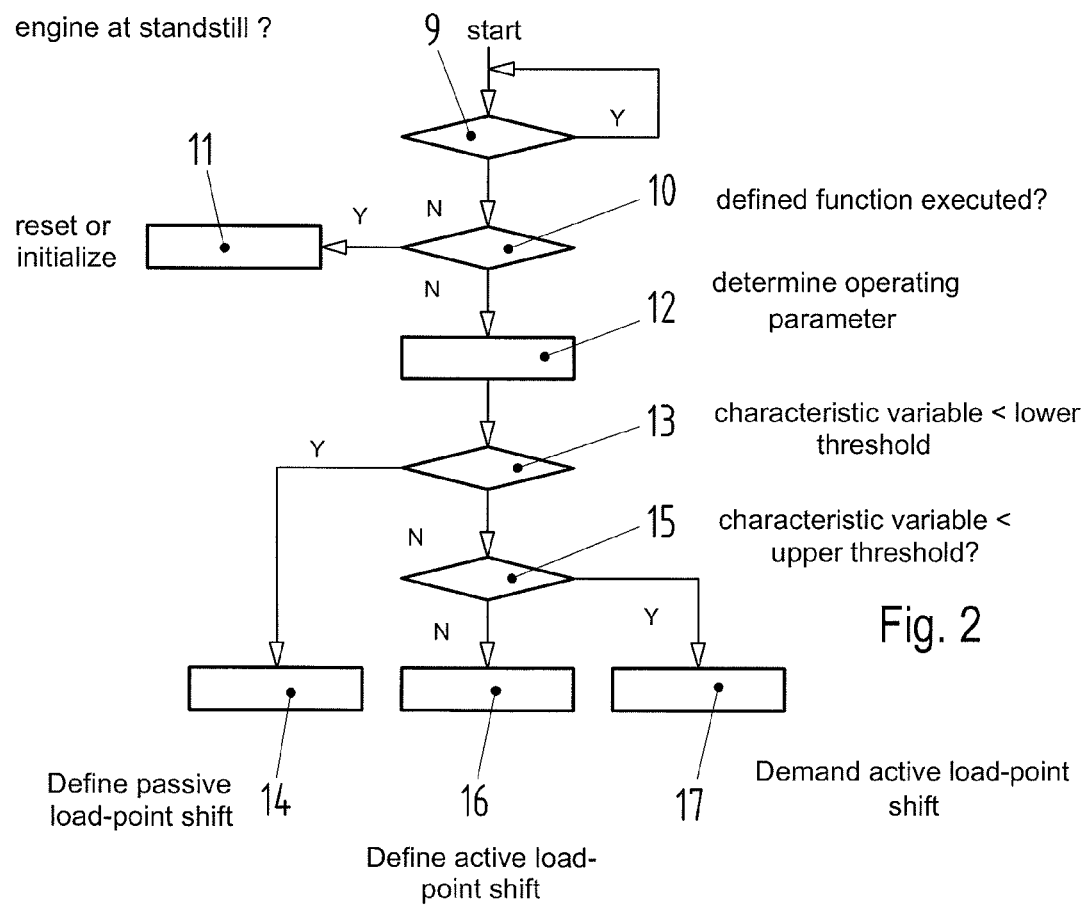
FIG. 2 shows a signal flow diagram illustrating the mode of operation of the control device according to aspects of the invention.

FIG. 2 illustrates further details of the invention on the basis of a signal flow diagram, wherein in a step 9 of the signal flow diagram, it is checked whether the internal combustion engine 2 is running or at a standstill.

If it is determined in step 9 that the internal combustion engine is at a standstill, then proceeding from step 9, a branch in the form of a return is followed back to step 9.

By contrast, if it is determined in step 9 that the internal combustion engine 2 is running or active, then a branch is followed to step 10, wherein in step 10, it is checked whether the respective function of the control device has been completely and/or successfully executed in the present driving cycle.

If this is the case, then proceeding from step 10, a branch is followed to step 11, and in step 11, the characteristic variable that the control device then determines when the internal combustion engine 2 is running and the respective defined function is not being executed is reset or initialized.

By contrast, if it is determined in step 10 that the respective controller function is not executed, or is executed incompletely, when the internal combustion engine is running, then proceeding from step 10, a branch is followed to step 12 in order to determine the characteristic variable, in particular the exhaust gas mass integral.

The value of the respective characteristic variable is subsequently checked.

In a step 13, it is thus checked whether the characteristic variable, in particular the exhaust gas mass integral, determined by the control device 6, specifically the engine controller 7, is below or above a lower threshold value.

If it is determined in step 13 that the characteristic variable is below a lower threshold value, then proceeding from step 13, a branch is followed to step 14, and the control device 6 predefines a passive load-point shift as a measure for influencing the operating state of the internal combustion engine 2, specifically preferably without a stop prohibition or alternatively with a stop prohibition when a positive driver demand is present.

By contrast, if it is determined in block 13 that the characteristic variable is above the lower threshold value, a branch is followed to step 15, wherein in step 15, it is checked whether the characteristic variable, in particular the exhaust gas mass integral, is above or below an upper threshold value.

If it is determined in step 15 that the characteristic variable is above the lower threshold value but below the upper threshold value, a branch is followed to step 16, wherein in step 16, an active load-point shift, specifically an active load shift with stop prohibition for the internal combustion engine 2 for as long as a positive driver demand is present, is predefined by the control device 6, that is to say by the engine controller 7, as a measure for influencing the operating state of the internal combustion engine 2.

If it is determined in step 15 that the characteristic variable, in particular the exhaust gas mass integral, is both above the lower threshold value and also above the upper threshold value, then proceeding from step 15, a branch is followed to step 17, and an active load-point shift with permanent stop prohibition for the combustion engine 2 is demanded by the control device 6, that is to say the engine controller 7.

The above characteristic variable, on the basis of which the control device 6, that is to say the engine controller 7, implements or demands different measures for influencing the operating state of the internal combustion engine 2, is reset or initialized not from journey to journey or from driving cycle to driving cycle but rather only when, with the internal combustion engine 2 running, the respective controller function has been executed fully once and/or the defined operating state of the internal combustion engine has occurred. Therefore, if the execution of the controller function is interrupted, no resetting or initializing of the characteristic variable to be determined takes place.

Even though the invention has been described for a hybrid vehicle and is particularly suitable for hybrid vehicles, it is pointed out that the invention may also be utilized for conventional motor vehicles for example with an automatic start-stop system. In the case of conventional motor vehicles, however, no load-point shift can be utilized.

What is claimed:

1. A control device of a hybrid motor vehicle having an internal combustion engine and an electric motor, the control device being configured for controlling the operation of the internal combustion engine and the electric motor of the motor vehicle,
    wherein when a defined function for diagnosing a condition of the internal combustion engine has not been executed by the control device because a defined operating state of the internal combustion engine has not occurred, the control device determines an operating parameter of the internal combustion engine, and on the basis of the determined operating parameter, the control device, in a temporally variable manner, selects one process from a plurality of processes for influencing the operating state of the internal combustion engine,
    wherein one of the processes includes changing the relative torques of the internal combustion engine and the electric motor while maintaining a constant drive torque of the hybrid motor vehicle, and the control device carries out the selected process based upon the determined operating parameter in order to facilitate eventual execution of the defined function for the diagnosing the condition of the internal combustion engine.

2. The control device as claimed in claim 1, wherein, when the internal combustion engine is running and when the respective defined function is not being executed and/or when the defined operating state of the internal combustion engine is not present, the control device determines the operating parameter of the internal combustion engine, and in that the different and thus variable measures for influencing the operating state of the internal combustion engine are determined by the control at variable time intervals as a function of the operating parameter.

3. The control device as claimed in claim 1, wherein the control device determines either a stop prohibition or no stop prohibition for the internal combustion engine as a function of the operating parameter.

4. The control device as claimed in claim 1, wherein the control device determines a combustion-air/fuel ratio for the internal combustion engine as a function of the operating parameter.

5. The control device as claimed in claim 1, wherein, said control device determines a passive load-point shift or an active load-point shift as a function of the operating parameter.

6. The control device as claimed in claim 5, wherein the control device demands a passive load-point shift if the operating parameter is below a lower threshold value, and in that the control device demands an active load-point shift if the operating parameter is above the lower threshold value.

7. The control device as claimed in claim 6, wherein the control device demands a permanent stop prohibition for the internal combustion engine if the operating parameter is also above an upper threshold value.

8. The control device as claimed in claim 7, wherein, if the operating parameter is below the upper threshold value and above the lower threshold value, said control device demands a stop prohibition for the internal combustion engine if a driver demand is positive.

9. The control device as claimed in claim 1, wherein the control device determines a combustion air mass value of the internal combustion engine or an exhaust gas mass value of the internal combustion engine as the operating parameter as a function of the length of time for which the respective defined function has not been executed and/or the length of time for which a defined operating state of the internal combustion engine has not occurred.

10. The control device as claimed in claim 1, wherein the control device determines a ratio between a driving distance covered with the internal combustion engine running and a driving distance covered with the internal combustion engine shut down, or a ratio between a driving duration with the internal combustion engine running and a driving duration with the internal combustion engine shut down, as the operating parameter as a function of the length of time for which the respective defined function has not been executed and/or the length of time for which a defined operating state of the internal combustion engine has not occurred.

11. The control device as claimed in claim 1, wherein the control device initializes or resets the operating parameter in the event of a switching-off or shutdown of the motor vehicle only if the respective defined function has previously been executed and/or the defined operating state of the internal combustion engine has previously occurred.

12. A method for operating a motor vehicle having an internal combustion engine and an electric motor, the control device being configured for controlling the operation of the internal combustion engine and the electric motor of the motor vehicle, the method comprising:
    determining an operating parameter of the internal combustion engine when a defined function for diagnosing a condition of the internal combustion engine has not been executed by the control device because a defined operating state of the internal combustion engine has not occurred,
    selecting one process from a plurality of processes for influencing the operating state of the internal combustion engine on the basis of the determined operating parameter, wherein one of the processes includes changing the relative torques of the internal combustion engine and the electric motor while maintaining a constant drive torque of the hybrid motor vehicle, and
    carrying out the selected process based upon the determined operating parameter in order to facilitate eventual execution of the defined function for diagnosing the condition of the internal combustion engine.

\* \* \* \* \*